United States Patent [19]
Hrusch

[11] 3,826,096
[45] July 30, 1974

[54] FLUID POWER DRIVE SYSTEM
[76] Inventor: Louis C. Hrusch, 13461 Green Dr., Chesterland, Ohio 44026
[22] Filed: Sept. 12, 1972
[21] Appl. No.: 288,404

[52] U.S. Cl. .................................60/709, 60/656
[51] Int. Cl. ............................................F01b 21/00
[58] Field of Search............. 60/20, 21, 59 T, 39.68

[56] References Cited
UNITED STATES PATENTS

| | | | |
|---|---|---|---|
| 1,015,415 | 1/1912 | Banner | 60/21 X |
| 1,188,164 | 6/1916 | Eberth | 60/21 |
| 2,418,477 | 4/1947 | Ostermann | 60/20 |
| 2,467,092 | 4/1949 | Ostermann | 60/20 |
| 2,482,791 | 8/1949 | Nettel et al. | 60/59 T X |
| 2,658,349 | 11/1953 | Keller | 60/59 T |
| 3,422,800 | 1/1969 | LaHaye | 60/59 T |

Primary Examiner—Edgar W. Geoghegan
Attorney, Agent, or Firm—Donnelly, Maky, Renner & Otto

[57] ABSTRACT

A fluid power drive system supplying pressurized fluid for operating pneumatic motors or other fluid responsive devices using a fluid compressor and turbine engine to develop pressurized fluid, the exhaust fluid from the turbine providing power for such pneumatic motors. The external work required to drive the compressor and turbine engine may be supplemented using a regenerative feedback apparatus including a second compressor and turbine combination of an idle turbine, each being driven by excess pressurized fluid not required by the pneumatic motors and released by a variable pressure relief mechanism.

11 Claims, 7 Drawing Figures

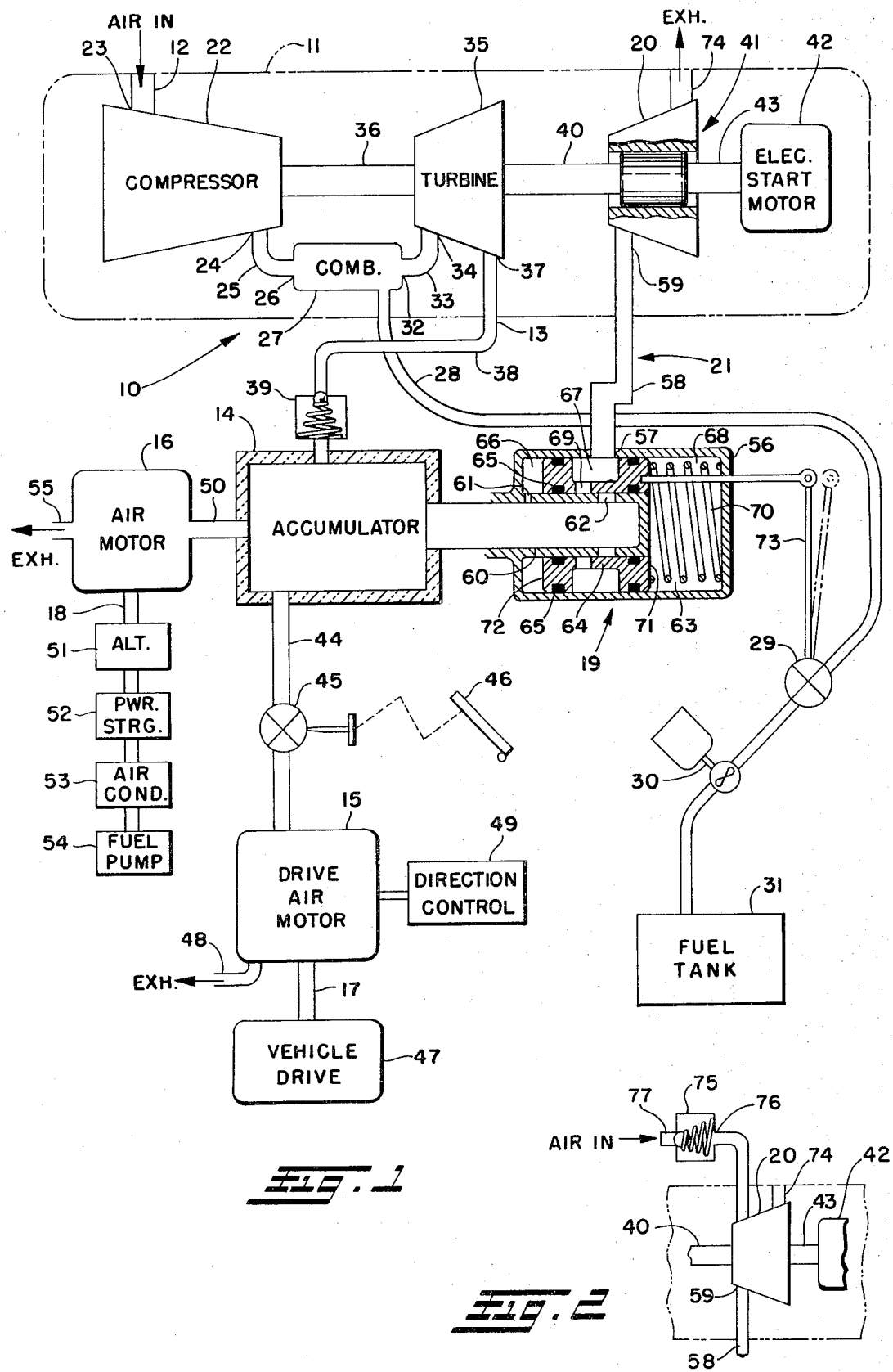

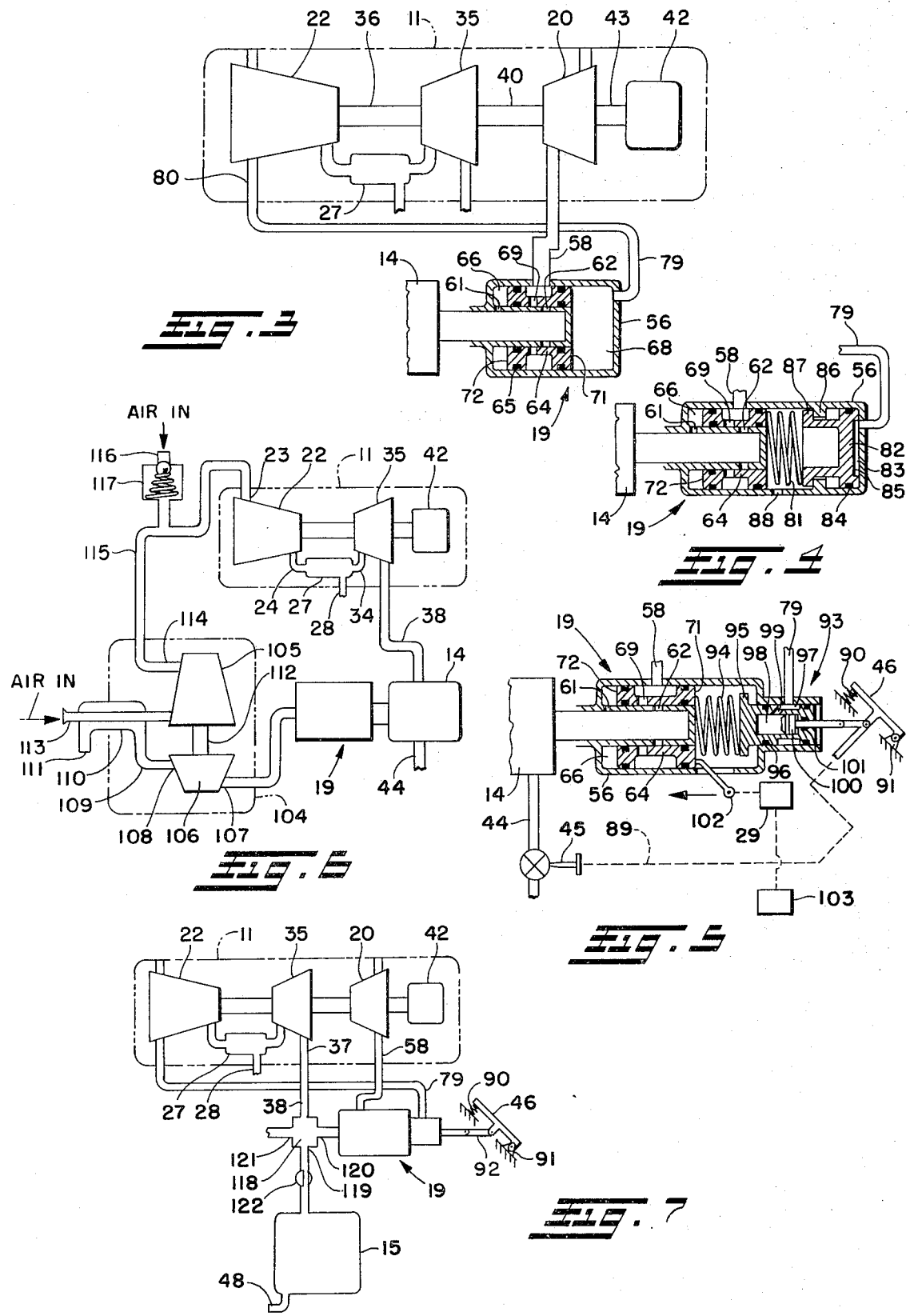

3,826,096

FLUID POWER DRIVE SYSTEM

Yet a further object of the invention is to provide a fluid power system wherein a gas turbine engine may be run at a constant, highly efficient speed regardless of the required output speed without employing a transmission.

Another object of the invention is to provide an improved fluid power drive system developing pressurized fluid for use in pneumatic motors and the like including a variable pressure control mechanism determining the amount of pressurized fluid available to such pneumatic motors.

An additional object of the invention is to provide an improved fluid power drive system developing from the pressurized fluid exhaust of a turbine engine a source of pressurized fluid for use by pneumatic motors or other fluid responsive devices.

A still further object of the invention is to provide an improved fluid power drive system including a turbine engine having a compressor for compressing fluid and supplying same to drive a turbine which drives the compressor, an accumulator for storing exhaust pressurized fluid from the turbine for subsequent supply to a pneumatic device, the pressure in the accumulator being variably controlled by a pressure relief mechanism, and regenerative feedback apparatus responsive to excess pressurized fluid released by the pressure relief mechanism reducing the external work required to drive the turbine engine.

Still another object of the invention is to provide an improved fluid power drive system including an engine developing pressurized fluid with apparatus for controlling fuel and pressurized fluid accumulation.

These and other objects and advantages of the present invention will become apparent as the following description proceeds.

To the accomplishment of the foregoing and related ends, the invention, then, comprises the features hereinafter fully described, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

FIG. 1 is a schematic representation of fluid power drive system coupled for use in a vehicle;

FIG. 2 is a schematic representation of an idle turbine having a check valve for use in a fluid power drive system;

FIG. 3 is a schematic representation of an automatic control for a pressure relief mechanism in a fluid power drive system;

FIG. 4 is a schematic representation of another automatic control for a pressure relief mechanism in a fluid power drive system;

FIG. 5 is a schematic representation of a pressure and fuel control apparatus in a fluid power drive system;

FIG. 6 is a schematic representation of the fluid power drive system including a secondary turbine and compressor regenerative feedback; and FIG. 7 is a schematic representation of a fluid power drive system having variable pressure relief mechanism to control pressurized fluid.

DESCRIPTION OF THE PREFERRED EMBODIMENT

Referring now to the drawings wherein like numerals refer to like elements in the several figures, the fluid power drive system of the invention will be described hereinafter as a power source for pneumatic-powered vehicle, although the invention may be used whenever a controlled source of pressurized fluid is required, for example to power pneumatic motors and other fluid responsive devices. Also, while the invention will be described using air as the pressurized fluid, it is contemplated that other fluids may be used.

Turning now to FIG. 1, the fluid power drive system 10 has an engine 11, for example a gas or other turbine engine, which has an air input 12 and develops pressurized air exhausted at an output 13 to a storage device or accumulator 14. The accumulator is, then, a pressurized air source supplying one or more fluid responsive devices, such as primary and secondary motors 15 and 16, which, for example, may be connected to drive shafts 17 and 18 for propelling a vehicle and providing power to the various accessories thereof.

A pressure relief mechanism generally indicated at 19, urged closed during normal engine 11 and motors 15 and 16 operation, is coupled to the accumulator 14 and opens when air pressure therein exceeds a determined level, for convenience called the cracking pressure of the mechanism, to relieve excessive pressure. The pressure relief mechanism 19 forms with an idle turbine 20 in the engine 11 a regenerative feedback apparatus 21, whereby excessive pressurized air is directed from the accumulator 14 to the idle turbine to assist driving the engine reducing the external work required to drive same, for example by reducing the amount of fuel delivered to the engine.

The engine 11 includes a compressor or impeller 22 having an air inlet 23 and an outlet 24 for compressed air coupled by a conduit 25 to the input 26 of a combustion chamber 27 in which fuel is burned to raise the energy level and to expand the compressed air passing therethrough. While the combustion chamber 27 may be a standard device for burning fuel, for example supplied through a fuel line 28, fuel control valve 29 and fuel pump 30 from a fuel tank 31, other devices for raising the energy level and expanding the fluid exiting the compressor may be used. The outlet 32 of the combustion chamber is coupled by a conduit 33 to the input 34 of the turbine 35 which is driven by the pressurized air producing an output rotational force on a drive shaft 36, and the outlet 37 of the turbine directs the exhaust pressurized air through a conduit 38 and a known check valve 39 to the accumulator 14. The drive shaft 36 couples the compressor 22 and the turbine 35, and as the former together with the combustion chamber supply pressurized air to the latter, the latter provides motive force for driving the former. The idle turbine 20 is mechanically coupled by a drive shaft 40 to the turbine 35 and compressor 22, for example by a known one-way clutch assembly generally shown at 41, and an electric start motor 42 coupled by a drive shaft 43 to the other elements of the engine provides the work to start the engine. Although the idle turbine 20 may be directly coupled to the drive shaft 40 without the one-way clutch, such coupling may produce unwanted drag on the engine 11 due to a partial vacuum in the idle turbine when the pressure relief mechanism is not open.

The accumulator 14 is coupled by a fluid connection conduit 44 and a throttle valve 45, controlled by an accelerator peddle 46, to the primary pneumatic motor 15 for propelling a vehicle 47, for example by the drive shaft 17. The pneumatic motor 15 has an exhaust 48 to the atmosphere, and a direction control mechanism 49 is coupled to the pneumatic motor for reversing its direction. The accumulator 14 may also be coupled to the secondary pneumatic motor 16 by a conduit 50, for example to operate vehicle accessories such as an alternator 51, power steering 52, air conditioner 53, fuel pump 54, etc., and the secondary pneumatic motor has an exhaust 55 through which pressurized air passes to the atmosphere. The accumulator 14 may be similar to various types of accumulators used in typical pneumatic or hydraulic drive systems for storing working medium under pressure while allowing the compressor to work at its own efficient capability even when instantaneous work demands are greater than the compressor ability.

Also connected to the accumulator 14 is the pressure relief mechanism generally indicated at 19 for limiting pressure accumulation in the accumulator when there is low demand for compressed air by the primary motor 15, for example when the vehicle is merely idling. The pressure relief mechanism 19 includes an outer casing 56 having an exit opening 57 coupled by a conduit 58 to the input 59 of the idle turbine 20, and an inner casing 60 including openings 61 and 62 therein, the inner and outer casings forming a generally hollow chamber 63 in the mechanism. A movable piston 64 positioned in the hollow chamber 63 and in sealed relation with the inner and outer casings 60 and 56, for example by O-rings 65, divides the hollow chamber 63 into three sub-chambers 66, 67, and 68. The first sub-chamber 66 is normally connected via opening 61 to received compressed air from the accumulator, while the second sub-chamber 67 may receive compressed air from the accumulator only when the opening 62 in inner casing and an opening 69 in the piston casing are aligned. The third sub-chamber 68 may include a spring 70 abutting the piston surface 71 urging the piston to the left while air pressure on the piston surface 72 urges the piston to the right. A mechanical linkage 73 coupled to the piston 64 through the third sub-chamber, is connected to control the fuel control valve 29.

In operation of the fluid power drive system of FIG. 1, the start motor 42 is energized during starting to drive the compressor 22 and turbine 35, and air entering the compressor is compressed therein. Fuel burned in the combustion chamber 27 provides power for the engine 11 by heating the compressed air adding energy thereto, and the heated air entering the turbine 35 expands to provide the work necessary to drive the turbine as in a standard turbine engine. Although the air has given up energy to drive the turbine and thus the compressor through the drive shaft 36, the air exiting the turbine is still partially heated and pressurized, and this air passes to the accumulator 14 for subsequent use, for example to drive the pneumatic motors 15 and 16.

The accumulator 14, then, is the main source of energy to drive the entire vehicle from which source the compressed air is delivered to the primary air motor 15 which may be, for example, a turbo-machine, a multi-cylinder reciprocating low speed mechanism similar to a steam engine drive, or other pneumatic motor. Using such motors, no transmission would be required with possibly only limited speed reduction being necessary, and the engine may be operated at a constant, highly efficient speed regardless of the drive system output requirements. The drive speed or drive effort of the vehicle is controlled by the accelerator pedal 46 operating a throttle valve 45 or a variable flow passage controlling the amount of compressed air delivered to the air motor, and vehicle direction may be reversed by a reverse valving of the air to the air motor, for example by the direction control mechanism 49. In operating the entire vehicle, the accumulator 14 supplies compressed air to the secondary air motor 16 to drive, for example, the alternator 51, power steering 52, air-conditioner 53, fuel pump 54, or other accessories used on the vehicle.

Excessive pressure accumulation in the accumulator 14, which would eventually stall the turbine engine 11, is avoided by the pressure relief mechanism 19 connected to the accumulator. The pressure relief mechanism is biased normally closed by the spring 70, i.e. the openings 62 and 69 not being aligned, until the cracking pressure just below that developed at the turbine output 37 plus stagnation effect to the accumulator is achieved, thereby maintaining a positive flow potential from the engine to the accumulator. As pressurized air enters the opening 61, a force is developed on the piston surface 72 opposing the spring force; and when the former is greater than the latter, the piston 64 moves to the right aligning the opening 62 and 69 thereby cracking or opening the mechanism 19.

The pressure relief mechanism 19 opens to release pressurized air from the accumulator 14 when it is not used by the motors 15 and 16 at a rate sufficient to stay with the incoming pressurized air. The excess pressurized air released by the pressure relief mechanism drives the idle turbine 20, which in turn supplements the external work required to drive the engine 11. Spent pressurized air passing from the idle turbine 20 is exhausted to the atmosphere through the exhaust 74. The one-way clutch 41 couples the idle turbine 20 to the drive shaft 40, whereby when the latter rotates faster than the former, a connection is not made, but when the former rotates faster than the latter, the drive shaft is driven by the idle turbine.

When the pressure relief mechanism 19 opens, it is due to pressurized air not being used by the motors at a high rate, and therefore less fuel should then be required by the engine 11. Accordingly, the opening and closing action of the pressure relief mechanism may produce a mechanical or electrical output, for example by the linkage 73, to control fuel flow to the engine at the fuel control valve 29, although other variable parameters of the fluid power drive system 10 may be used to control fuel flow, such as engine rpm which may be mechanically, pneumatically, or electrically sensed.

Referring now to FIG. 2, a check valve 75 is connected to an air inlet 76 of the idle turbine 20. The check valve may be any known check valve open at its inlet end 77 to ambient air permitting flow of ambient air therethrough into the idle turbine 20 when the pressure at the outlet 78 of the check valve is less than that of ambient air. The check valve is useful to eliminate the vacuum in the idle turbine 20 and conduit 58 when the former is directly coupled to the drive shaft 40. In operation, when pressure in the accumulator 14 is insufficient to crack the pressure relief mechanism 19 no pressurized air is directed to the idle turbine 20, which is rotated by the drive shaft 40 creating a partial vacuum in the idle turbine and in the conduit 58. Without the check valve 75 and air inlet 76 the vacuum would produce excessive drag on the engine 11, but with the check valve ambient air may be drawn into the idle turbine eliminating the drag.

Turning now to FIG. 3, the accumulator 14 is connected to the pressure relief mechanism 19, which is connected by conduit 58 to the idle turbine 20 in the engine 11, as described above with reference to FIG. 1. However, replacing the spring previously described in the pressure relief mechanism 19, is a bias control conduit 79 coupled between the compressor 22 at an output 80 thereof and the third sub-chamber 68 of the pressure relief mechanism providing a variable bias on the piston 64 to avoid excessive back pressure to the engine 11 during starting, generally before combustion has begun, or at any low rpm operation of the engine.

In operation when the compressor 22 is starting or otherwise operating at low rpm, a minimum amount of compressed air is fed via the bias control conduit 79 to the third sub-chamber 68 of the pressure relief mechanism 19 thereby permitting a minimum amount of pressurized air entering the first sub-chamber 66 from the accumulator 14 to urge the piston 64 to the right aligning the openings 62 and 69 cracking the mechanism. Such operation provides a by-pass from the compressor 22 via the accumulator 14 and pressure relief mechanism 19 to the idle turbine eliminating back pressure on the engine 11 during such low power operation. As engine compressor 22 comes up to speed the pressure in the third sub-chamber 68 increases urging the piston 64 to the left closing the mechanism and therefore requiring increased pressure at piston surface 72 to crack the mechanism. Although the by-pass is shown as being varied by a pneumatic bias force on the pressure relief mechanism, a mechanical or electrical read-out of engine rpm may be used to vary such bias on the piston during starting or low engine rpm operation as well as during normal operation.

Referring now to FIG. 4, the pressure relief mechanism 19 coupled to the accumulator 14 and of similar design to that described with reference to FIGS. 1 and 3, additionally includes a resilient member or spring 81 and further piston 82 for variably loading the spring and forming in the outer casing 56 a fourth sub-chamber 83, for example by the O-ring seals 84, and the piston surface 85, which sub-chamber is coupled by the bias control conduit 79 to the engine compressor 22. A stop member 86 formed in the outer casing 56 of the pressure relief mechanism cooperates with flanged portions 87 of the further piston 82 to limit movement thereof within the outer casing, and an opening 88 in the outer casing and between the two pistons maintains ambient pressure therebetween.

In operation, the bias control conduit 79 directs compressed air from an outlet 80 of the engine compressor 22 to the fourth sub-chamber 83 to variably load the spring 81. During starting or low engine rpm operation the compressor output is low, and thus force produced on the further piston surface 85 is also low producing minimum loading of the spring 81 and permitting a minimum force on the piston surface 72 to urge same to the right aligning the openings 62 and 69. As the compressor output increases, additional compressed air is fed to the fourth sub-chamber of the pressure relief mechanism urging the further piston 82 to the left increasing the load on the spring 81 tending to close the pressure relief mechanism. The piston 64 thus being urged to the left required additional pressure on the surface 72 thereof to crack the mechanism to relieve pressure in the accumulator 14.

In FIG. 5, the pressure relief mechanism 19 is connected to the accumulator 14 which is connected through a fluid connection conduit 44 and throttle valve 45 to a motor or other device not shown. The throttle valve is connected, for example by a mechanical linkage 89, to the accelerator pedal 46 which is biased by a spring 90 about a fixed pivot 91 and is also connected by a mechanical linkage 92 to the pressure relief mechanism 19. The pressure relief mechanism, similar to that described above with reference to FIG. 1, additionally includes a biasing mechanism generally indicated at 93 for avoiding back pressure to the engine 11 during starting and otherwise low engine rpm operation while increasing the pressure capacity of the accumulator 14 by increasing the cracking pressure when increased power is required. The biasing mechanism 93 includes a resilient member or spring 94 positioned in the outer casing 56 of the pressure relief mechanism in sealed relation therewith, for example by O-rings 96. A supplemental chamber 97 receiving compressed air through the bias control conduit 79 from the engine compressor 22 is connected to a piston chamber 98 by a passage 99. A small piston 100 sealed in the piston chamber 98 by O-rings 101 is connected to the accelerator pedal 46 by the mechanical linkage 92. An extension arm 102, pending from the piston surface 71 in the pressure relief mechanism provides a mechanical linkage to the fuel control valve 29 for controlling fuel to the engine 11 whereby fuel flow is maximum when the piston 64 and arm are in the left position as shown by the arrow. Alternatively, fuel control may be dependent on a mechanical or electrical engine rpm sensitive device schematically indicated at 103.

In operation of the pressure relief mechanism shown in FIG. 5 the load on the spring 94 controlling the cracking pressure is varied both by engine compressor 11 pressure and accelerator pedal 46 position. During starting and low engine rpm operation the small piston 100 is maintained in the right hand position of the piston chamber 98 by the accelerator pedal 46, and the low air pressure received in the piston chamber through the bias control conduit 79 has virtually no effect on the further piston 95. Therefore, the spring 94 is in substantially fully extended position producing minimum force on the piston surface 71 permitting only minimum pressure on the piston surface 72 to urge same to crack the pressure relief mechanism directing pressurized air to the idle turbine 20 and avoiding back pressure and stall effect on the engine 11.

During normal engine operation as increased power is required, the accelerator pedal 46 is depressed opening the throttle valve 45 and loading the spring 94 through the further piston 95 increasing the cracking pressure and therefore increasing the amount of pressurized air that may be stored in the accumulator 14 and avialabe to the motors 15 and 16. Where the engine compressor 22 is operating at normal speed, the compressed air therefrom increases the pressure in the supplemental chamber 97 and the piston chamber 98 to lengthen the link between the small piston 100 and the further piston 95 providing increased loading potential for the spring 94.

Referring to FIG. 6, the engine 11 includes a compressor 22, combustion chamber 27, turbine 35, and electric start motor 42 all coupled and operable as described above with reference to FIG. 1. The exhaust gases from the turbine 35 are directed to an accumulator 14, having one outlet to a fluid connection conduit 44 supplying pressurized air to a motor or other fluid responsive device, and another outlet connected to a pressure relief mechanism 19, for relieving excess pressure in the accumulator and providing a fluid by-pass during starting or low engine rpm operation, as previously described. The output 57 of the pressure relief mechanism is coupled by a conduit 58 to a regenerative feedback apparatus 104 including a further compressor 105 and turbine 106 at the input 107 thereof. The exhaust gas outlet 108 of the further turbine is coupled by a conduit 109 to a heat exchanger 110 and then to an exhaust 111 to the atmosphere. The further turbine 106 is mechanically coupled by a drive shaft 112 to the further compressor 105 which has an air input 113 passing through the heat exchanger and a compressed air outlet 114 coupled by a conduit 115 to provide a compressed air input for the input 23 of the engine compressor 22. A further air input conduit 116 provides an ambient air input to the engine compressor 22 through a check valve 117 to prevent loss of compressed air from the further compressor 105.

The engine 11, accumulator 14, and pressure relief mechanism 19 operate as described above; however, the excess pressurized air released from the accumulator by the pressure relief mechanism is directed to the regenerative feedback apparatus 104 to drive the further turbine 106, which drives the further compressor 105. Ambient air entering the further compressor 105 is heated by the further turbine exhaust gases in the heat exchanger 110, and the heated compressed air from the further compressor is supplied to the engine compressor 22. To supplement the heated compressed air entering the engine compressor 22, ambient air is drawn into the engine compressor through the check valve 117. Thus, when minimum pressurized air is required, for example to drive a vehicle, excess pressurized air from the accumulator 14 drives the further turbine 106 and compressor 105 to produce an input of heated compressed air to the engine compressor 22, thereby reducing the external work required to drive the turbine engine 11. Accordingly, as less external work is required, a fuel control mechanism, as described above, reduces the amount of fuel supplied to the engine 11.

In FIG. 7, the engine 11 includes a compressor 22, combustion chamber 27, turbine 35, idle turbine 20 and electric start motor 42 all coupled and operable as described above with reference to FIG. 1. The turbine outlet 37 is coupled by a conduit 38 to a distribution volume 118 which distributes pressurized air to a motor 15, pressure relief mechanism 19, and to any other fluid responsive device through outlets 119, 120, and 121, respectively. The pressure relief mechanism 19 is coupled by a conduit 58 to the distribution volume, to connect the distribution volume and idle turbine 20 to connect same directly to the distribution volume 118 when no pressurized air is to be directed to the motor 15, for example when the vehicle is idling, and a neutral position shut-off valve 122 also stops air from reaching the motor. The pressure relief mechanism 19, for example similar to that described with reference to FIG. 5, is connected by a bias control conduit 79 to the engine compressor 22 for biasing, as described above, and the accelerator pedal 46 mounted by a spring 90 and a pivot 91 and coupled to the mechanism by a linkage 92 further controls the cracking pressure.

Operation of the fluid power drive system shown in FIG. 7 is automatically controlled by air pressure from the bias control conduit 79 and manually controlled by the accelerator pedal 46. The engine in start, low rpm, and normal operations functions as described above, for example, with reference to FIG. 1, except the compressed air supplied to the motor 15 from the turbine 35 via the distribution volume 118 is directly controlled by the pressure relief mechanism 19. Specifically, when no force is applied to the accelerator pedal 46, the pressure relief mechanism remains open or cracked and virtually no pressurized air flows to the drive air motor. When force is applied to the accelerator pedal 46, the pressure relief mechanism 19 is urged closed, and pressurized air then flows to the drive air motor, provided the valve 122 is open. As pressure increases behind on the piston surface 72 (not shown) of the pressure relief mechanism urging the piston to the right against the force of the accelerator pedal 46 and a spring (not shown) associated therewith, as described for example with reference to FIG. 5, the mechanism will again partially crack allowing some pressurized air to flow to the idle turbine to prevent too much pressurized air from flowing to the motor 15. To insure fuel control and economy, the fuel flowing to the combustion chamber 27 through fuel line 28 may be controlled by a linkage (not shown) connected to the piston of the pressure relief mechanism, as described above.

As can now be seen from the above description, the invention relates to an improved fluid power drive system for pneumatic motors or other fluid responsive devices using pressurized fluid as the medium for driving such devices, which system provides a relatively constant source of pressurized fluid from an efficiently operated engine which may be run at a substantially constant speed regardless of output speed requirement with regenerative feedback power being supplied to the engine when pressurized fluid is not required by the fluid responsive devices.

The embodiments of the invention in which an exclusive property or privilege is claimed are defined as follows:

1. A fluid power drive system comprising turbine engine means for providing from an input fluid a pressurized output fluid, means providing power to said turbine engine means for supplying work to drive same, storage means coupled to said turbine engine means for storing pressurized fluid, fluid connection means for connecting said storage means to apparatus responsive to pressurized fluid, and control means for controlling pressure in said storage means.

2. A fluid power drive system as set forth in claim 1 wherein said control means comprises normally closed pressure relief valve means for relieving excess pressure in said storage means.

3. A fluid power drive system as set forth in claim 2 wherein said turbine engine means comprises primary compressor means for producing from an input fluid a compressed output fluid, said primary compressor means having a fluid inlet and a fluid outlet, primary turbine means mechanically coupled to said primary compressor means for driving same, said primary turbine means having a fluid inlet and a fluid outlet, energy producing means in fluid communication between said primary compressor means fluid outlet and said primary turbine means fluid inlet for increasing the energy level of such compressed output fluid and directing same to said primary turbine means, and said storage means being in fluid communication with said primary turbine fluid outlet.

4. A fluid power drive system as set forth in claim 3 wherein said pressure relief valve means comprises variable pressure relief valve means having a variable parameter determining valve opening pressure, and further comprising means connecting said variable pressure relief valve means to said primary compressor means for adjusting such parameter.

5. A fluid power drive system as set forth in claim 3 wherein said pressure relief valve means comprises variable pressure relief valve means, and further comprising power control means for controlling work supplied by said means for supplying.

6. A fluid power drive system as set forth in claim 3 further comprising regenerative means coupled to said control means for supplying supplemental work to drive said turbine means having a fluid inlet in fluid communication with said pressure relief valve means and a fluid outlet, secondary compressor means mechanically coupled to and driven by said secondary turbine means for producing from an input fluid a compressed output fluid, said secondary compressor means having a fluid inlet and a fluid outlet, and means connecting said fluid outlet of said secondary compressor means to said fluid inlet of said primary compressor means.

7. A fluid power drive system as set forth in claim 3 further comprising regenerative means coupled to said control means for supplying supplemental work to drive said turbine engine means, said regenerative means including secondary turbine means having a fluid inlet in fluid communication with said pressure relief valve means, a fluid outlet, and mechanical output means coupled to said primary compressor means and said primary turbine means for driving same.

8. A fluid power drive system as set forth in claim 7 further comprising clutch means for mechanically connecting said secondary turbine means to said primary compressor means and said primary turbine means upon operation of said secondary turbine means.

9. A fluid power drive system as set forth in claim 7 further comprising valve means coupled to said secondary turbine means for permitting fluid flow into said secondary turbine means when said secondary turbine means is not in operation.

10. A fluid power drive system as set forth in claim 1 wherein said turbine engine means comprises gas turbine engine means, and wherein said means providing power, storage means, and control means cooperate with said gas turbine engine means normally to run at constant highly efficient speed regardless of required output speed.

11. A fluid power drive system comprising engine means for providing pressurized fluid, means providing power to said engine means for supplying work to drive said engine means, storage means coupled to said engine means for storing pressurized fluid, fluid connection means for connecting said storage means to apparatus responsive to pressurized fluid, control means for controlling pressure in said storage means, and regenerative means coupled to said control means for supplying supplymental work to drive said engine means.

* * * * *